United States Patent [19]

Nauta

[11] Patent Number: 5,510,751
[45] Date of Patent: Apr. 23, 1996

[54] LINE DRIVER WITH ADAPTIVE OUTPUT IMPEDANCE

[75] Inventor: Bram Nauta, Eindhoven, Netherlands

[73] Assignee: U.S. Philips Corporation, New York, N.Y.

[21] Appl. No.: 261,508

[22] Filed: Jun. 17, 1994

[30] Foreign Application Priority Data

Jul. 14, 1993 [EP] European Pat. Off. .............. 93202166

[51] Int. Cl.$^6$ .................................................. H03F 3/68
[52] U.S. Cl. ............................ 330/84; 330/85; 330/260; 330/295
[58] Field of Search .................................. 326/63, 82, 89; 330/84, 85, 260, 295

[56] References Cited

U.S. PATENT DOCUMENTS

| | | | |
|---|---|---|---|
| 4,491,802 | 1/1985 | Uchida et al. ........................ | 330/85 X |
| 5,034,698 | 7/1991 | Moriyasu ................................. | 330/84 |
| 5,121,080 | 6/1992 | Scott, III et al. ....................... | 330/260 |

*Primary Examiner*—James B. Mullins
*Attorney, Agent, or Firm*—Laurie E. Gathman

[57] ABSTRACT

A line driver comprising: an input terminal for receiving an input signal, an output terminal for connecting a load, a first and a second transconductance-controlled transconductor having substantially equal transconductances, each transconductor having a non-inverting input, an inverting input, an output and a common control input for controlling the transconductance, the non-inverting inputs of the first and second transconductors being coupled to the input terminal, the outputs of the first and second transconductors being coupled to the output terminal, the inverting input of the first transconductor being coupled to a point of reference potential, the inverting input of the second transconductor being coupled to the output terminal, and an amplifier having a non-inverting input, an inverting input and an output coupled to, respectively, the input terminal, the output terminal and the common control input of the first and the second transconductors.

3 Claims, 2 Drawing Sheets

LINE DRIVER WITH ADAPTIVE OUTPUT IMPEDANCE

BACKGROUND OF THE INVENTION

The invention relates to a line driver. A line driver is an electronic buffer amplifier designed to have an output impedance matched to the characteristic impedance of a transmission line. Transmission lines are widely used for conveying electrical signals. To minimize reflections the source and load impedances of the transmission line should be equal to the characteristic impedance of the transmission line. A standard value for video applications is 75 ohms. A buffer amplifier designed to drive a 75 ohm transmission line should have an output impedance of 75 ohms in order to minimize reflections. The buffer sees a load impedance of 75 ohms, i.e. the impedance of the terminated transmission line.

A straightforward approach to implement such a buffer is to provide a low-impedance output stage with a series resistor having a value equal to the characteristic impedance of the transmission line. This approach has several disadvantages. Firstly, the resistance value of the series resistor is subject to tolerances, particularly to process variations if the buffer is integrated on a semiconductor chip, resulting in impedance mismatch. Second, the impedance of the output stage is no longer low and the output impedance of the buffer increases at high frequencies, while the influence of transmission line reflections is most pronounced at these high frequencies. Third, the voltage drop across the series resistance must be regarded as a loss, which is unattractive in low supply voltage applications. This voltage drop is equal to the output voltage of the buffer and is typically 1 V for video signals.

U.S. Pat. No. 5,121,080 discloses a line driver comprising an operational transconductance amplifier (OTA) having a non-inverting and an inverting input and a first and a second current output for supplying currents in response to the voltage difference between the non-inverting and inverting inputs. The first current output is connected to the inverting input, and the second current output, which forms the output of the line driver, is connected to the inverting input through a feedback conductance. An input conductance is connected from the inverting input to ground, and the input signal is connected to the non-inverting input. The currents provided by the first and second current outputs are proportional to each other by a predetermined ratio. By proper selection of this predetermined ratio and of the feedback and input conductances the desired output impedance and overall gain of the line driver into a given load impedance can be achieved. This known line driver constitutes a line driver having a specified output impedance without the voltage amplitude loss of the series resistor approach. The output impedance of this known line driver, however, is still dependent on variations in the selected output current ratio and on the values of the selected input and feedback transconductances.

SUMMARY OF THE INVENTION

Therefore, it is an object of the invention to provide a line driver having no voltage loss and having an output impedance which is less sensitive to the variations. According to the invention there is provided a line driver comprising:

an input terminal for receiving an input signal,
an output terminal for connecting a load,
a first and a second transconductance-controlled transconductor having substantially equal transconductances, which transconductances are controllable by means of a control signal applied to a common control input, each transconductor comprising a non-inverting input, an inverting input, and an output, one input of the first transconductor and a corresponding input of the second transconductor being coupled to the input terminal, the outputs of the first and second transconductors being coupled to the output terminal, the other input of the first transconductor being coupled to a point of reference potential, the other input of the second transconductor being coupled to the output terminal, and an amplifier having a non-inverting input, an inverting input and an output, one of the inputs of the amplifier being coupled to the input terminal, the other input of the amplifier being coupled to the output terminal, and the output of the amplifier being coupled to the common control input to supply the control signal.

The liner driver according to the invention automatically adapts its output impedance to the impedance of the load and rules out process variations to a large extent. Moreover, the architecture of the line driver does not produce any voltage loss.

BRIEF DESCRIPTION OF THE DRAWINGS

These and other aspects of the invention will be described in more detail, by way of example, with reference to the accompanying drawings, in which.

DETAILED DESCRIPTION OF THE PREFERRED EMBODIMENT

In the Figures corresponding elements have the same reference signs.

Figure 1:
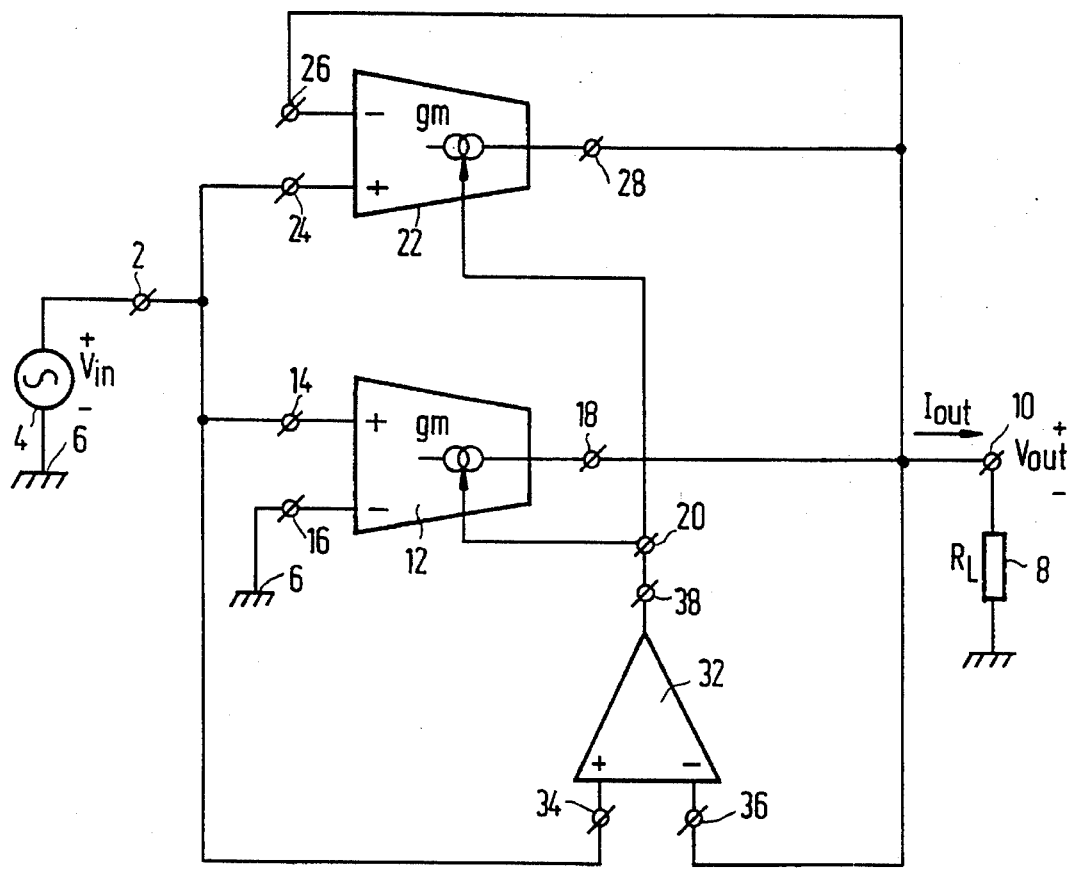
FIG. 1 shows a block diagram of a first embodiment of a line driver according to the invention.

FIG. 1 illustrates the basic principle of the adaptive line driver according to the invention. The line driver comprises an input terminal 2 for receiving an input voltage $V_{in}$ from an input voltage source 4 with respect to a point 6 at reference potential, which point is connected to signal ground. A load 8 represents a terminated transmission line having a characteristic impedance $R_L$ connected to an output terminal 10 and ground. The output voltage and output current at output terminal 10 are $V_{out}$ and $I_{out}$, respectively. The line driver further comprises a first transconductance-controlled transconductor 12, having a non-inverting input 14, an inverting input 16, an output 18, and a second transconductance-controlled transconductor 22 having a non-inverting input 24, an inverting input 26, and an output 28. The transconductance gm of the first transconductor 12 and that of the second transconductor 22 are substantially equal and can be controlled by means of a control signal at a common control input 20. The non-inverting inputs 14 and 24 of the first and the second transconductor 12 and 22 are coupled to the input terminal 2 and receive the input voltage $V_{in}$. The outputs 18 and 28 of the first and the second transconductor 12 and 22 are coupled to the output terminal 10. The inverting input 16 of the first transconductor 12 is connected to ground and the inverting input 26 of the second transconductor 22 is coupled to the output terminal 10. The voltage transfer from input terminal 2 to output terminal 10 is non-inverting. There is also provided an amplifier 32 having a non-inverting input 34 coupled to the input terminal 2, an inverting input 36 coupled to the output terminal 10, and an output 38 coupled to the control input 20 of the first and the second transconductor 12 and 22. It is assumed here that an increase of the control signal at the control input 20 causes the transconductance gm of the first and the second transconductor 12 and 22 to increase. If this is not the case, the non-inverting input 34 and the inverting input 36 of the amplifier 32 should be interchanged.

For the time being, the circuit will be considered without the amplifier 32. The effect of this amplifier will be discussed later. The transconductor 12 and the transconductor 22 have substantially equal transconductances gm, which can be achieved easily in integrated circuits. These transconductances can be varied electronically by means of a control signal at the control input 20. The voltage transfer from $V_{in}$ to $V_{out}$ is:

$$\frac{V_{out}}{V_{in}} = \frac{2gmR_L}{1 + gmR_L} \quad (1)$$

The output impedance $R_{out}$ of the line driver is:

$$R_{out} = -\frac{\delta V_{out}}{\delta I_{out}} = \frac{1}{gm} \quad (2)$$

From equation (2) it follows that the output impedance $R_{out}$ of the line driver is determined by the transconductance gin, which can be varied electronically. It is assumed that gm has been tuned in such a way that the output impedance $R_{out}$ is equal to the impedance $R_L$ of the load 8. For an optimum impedance matching it then follows that the optimum transconductance $gm_{opt}$ is:

$$gm_{opt} = \frac{1}{R_L} \quad (3)$$

Combining equations 1 and 3 results in $V_{out}$ being equal to $V_{in}$. The voltage gain of the line driver is then 1. This fact can be exploited in tuning gm to $gm_{opt}$.

The amplifier 32 is considered now. The amplifier 32 controls the transconductance gm of the first and second transconductors 12 and 22 in such a way that the voltage difference between the non-inverting input 34 and the inverting input 36 becomes virtually zero, resulting in $V_{out}$ being equal to $V_{in}$ and thus gm being equal to $gm_{opt}$. The bandwidth of the amplifier 32 may be smaller than the bandwidth of the transconductors 12 and 22. In that case the transconductance gm is only tuned to $gm_{opt}$ for low frequencies. For high frequencies the control loop is inoperative but equation 2 remains valid and the correct output impedance is maintained as far as the bandwidth of the transconductors permits.

As long as $V_{in}$ equals $V_{out}$ no voltage is lost in the line driver and the differential input voltage of the second transconductor 22 is zero. The second transconductor 22 then need not generate any output current and only dissipates quiescent power.

Figure 2:
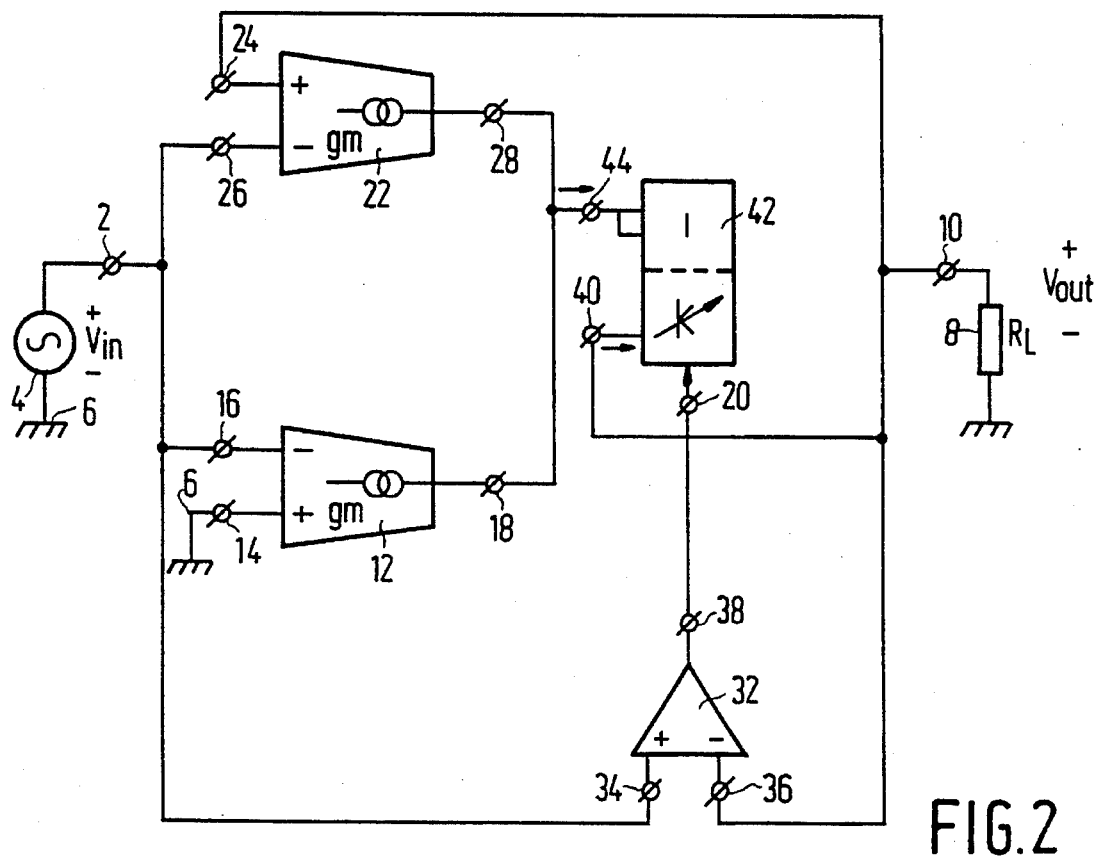
FIG. 2 shows a block diagram of a second embodiment of a line driver according to the invention.

To save power in the transconductors the output currents of the first and second transconductors 12 and 22 may, in addition, be multiplied by means of a current mirror as shown in FIG. 2. Here the output terminal 10 is connected to a current output terminal 40 of a current mirror 42. A current input terminal 44 of the current mirror 42 is connected to the outputs 18 and 28 of the transconductors 12 and 22. The current mirror 42 has a current gain k which can be controlled by means of a control signal at the common control input 20, which is coupled to the output 38 of the amplifier 32. The non-inverting input 34 and the inverting input 36 of amplifier 32 should be interchanged if an increasing control signal at the control input 20 would produce a decreasing current gain k. The current mirror 42 causes a phase reversal in the current transfer from the commoned outputs 18 and 28 to the output terminal 10. For this reason the non-inverting inputs 14 and 24 and the inverting inputs 16 and 26 of the transconductors 22 and 12 must also be interchanged in order to maintain a non-inverting voltage transfer from the input terminal 2 to the output terminal 10.

The transconductors 12 and 22 now have a fixed equal transconductance gm, which is multiplied by the controllable factor k of the current mirror 42. The overall effect is the same as demonstrated for the line driver of FIG. 1. Alternatively, the transconductors 12 and 22 may in addition have a common control input as shown in FIG. 1, which is also coupled to the output 38 of the amplifier 32.

Figure 3:
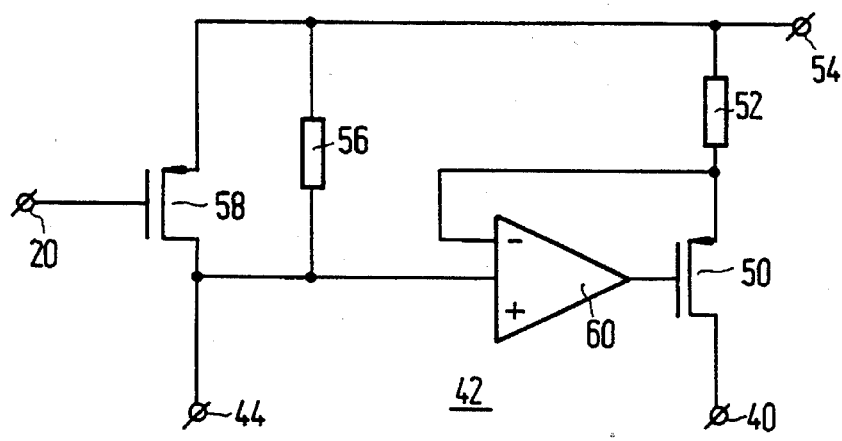
FIG. 3 shows a circuit diagram of a part of the second embodiment of FIG. 2.

The transconductance-controlled transconductors 12 and 22 and amplifier 32 are known devices and are commercially available. Any transconductor or operational transconductance amplifier (OTA) and any differential amplifier suitable for the intended application can be used. FIG. 3 shows an example of the current mirror 42. The output branch of the current mirror 42 is formed by a series arrangement of a PMOS transistor 50 and a resistor 52 between the current output terminal 40 and a positive supply terminal 54. The drain of transistor 50 is connected to the current output terminal 40 and the source is connected to the positive supply terminal 54 via the resistor 52. The input branch is formed by a parallel arrangement of a resistor 56 and the drain-source path of a PMOS transistor 58, which are both connected between the current input terminal 44 and the positive supply terminal 54. The gate of the transistor 58 is coupled to the control input 20 to control the resistance of the PMOS transistor. A comparator 60 compares the voltage drop across the resistor 52 with the voltage drop across the parallel resistors 56 and 58 and drives the gate of the transistor 50 to equalize the voltage drops. By changing the resistance of transistor 58 the ratio k between the current at the current input terminal 44 and the current at the current output terminal 40 can be varied.

The line driver according to the invention may be employed in Local Area Networks (LAN) for computer systems, video buffers, audio line drivers, telephone communication networks and the like.

I claim:

1. A line driver comprising:

an input terminal for receiving an input signal;

an output terminal for connecting a load;

a first transconductance-controlled transconductor having i) a control input for being controlled by a control signal, ii) a non-inverting input, iii) an inverting input, and iv) an output coupled to the output terminal;

a second transconductance-controlled transconductor having i) a control input for being controlled by the control signal, ii) a non-inverting input, iii) an inverting input, and iv) an output coupled to the output terminal, and one of the non-inverting and inverting inputs of the first transconductor and a corresponding input of the second transconductor being coupled to the input terminal, the other of the non-inverting and inverting inputs of the first transconductor being coupled to a point of reference potential, the other of the non-inverting and inverting inputs of the second transconductor being coupled to the output terminal; and an amplifier having a non-inverting input, an inverting input and an output, one of the inputs of the amplifier being coupled to the input terminal, the other input of the amplifier being coupled to the output terminal, and the output of the amplifier being coupled to the control inputs to supply the control signal.

2. A line driver comprising:

an input terminal for receiving an input signal;

an output terminal for connecting a load;

a first transconductance-controlled transconductor having i) a control input for being controlled by a control signal, ii) a non-inverting input, iii) an inverting input, and iv) an output coupled to the output terminal;

a second transconductance-controlled transconductor having i) a control input for being controlled by the control signal, ii) a non-inverting input, iii) an inverting input, and iv) an output coupled to the output terminal, and one of the non-inverting and inverting inputs of the first transconductor and a corresponding input of the second transconductor being coupled to the input terminal, the other of the non-inverting and inverting inputs of the first transconductor being coupled to a point of reference potential, the other of the non-inverting and inverting inputs of the second transconductor being coupled to the output terminal; and a control device coupled to the control inputs for controlling the transconductances of the first and second transconductors such that each transconductance is equivalent to $1/R_L$ where $R_L$ is the resistance of the load.

3. A line driver, comprising:

an input terminal for receiving an input signal;

an output terminal for connecting a load;

a first and a second transconductance-controlled transconductor having substantially equal transconductances, each transconductor comprising a non-inverting input, an inverting input, and an output, one input of the first transconductor and a corresponding input of the second transconductor being coupled to the input terminal, the outputs of the first and second transconductors being coupled together, the other input of the first transconductor being coupled to a point of reference potential, the other input-of the second transconductor being coupled to the output terminal;

a current mirror having a current input terminal coupled to the outputs of the first and second transconductors and having a current output terminal coupled to the output terminal, the current gain between the current output terminal and the current input terminal of the current mirror being controllable in response to a control signal at a control input; and an amplifier having a non-inverting input, an inverting input and an output, one of the inputs of the amplifier being coupled to the input terminal, the other input of the amplifier being coupled to the output terminal, and the output of the amplifier being coupled to the control input to supply the control signal.

* * * * *